(No Model.)

A. W. BILLMAN.
HOSE COUPLING.

No. 590,956. Patented Oct. 5, 1897.

Attest
Walter Donaldson
F. L. Middleton

Inventor
August W. Billman
by Richard & Co.
Atty

UNITED STATES PATENT OFFICE.

AUGUST WILHELM BILLMAN, OF STOCKHOLM, SWEDEN.

HOSE-COUPLING.

SPECIFICATION forming part of Letters Patent No. 590,956, dated October 5, 1897.

Application filed April 5, 1897. Serial No. 630,818. (No model.) Patented in Finland February 11, 1897, No. 685.

*To all whom it may concern:*

Be it known that I, AUGUST WILHELM BILLMAN, a subject of the King of Sweden and Norway, and a resident of Stockholm, Sweden, have invented certain new and useful Improvements in Hose-Couplings, of which the following is a specification.

The invention has been patented in Finland, No. 685, February 11, 1897.

My invention relates to a hose-coupling composed of two symmetrical halves or sections, and has for its purpose to so arrange these halves that they may be instantaneously coupled together or disconnected, while their interlocking action is assisted by the water-pressure in the hose, making the joint more perfect the more said water-pressure is increased.

Figure 1:
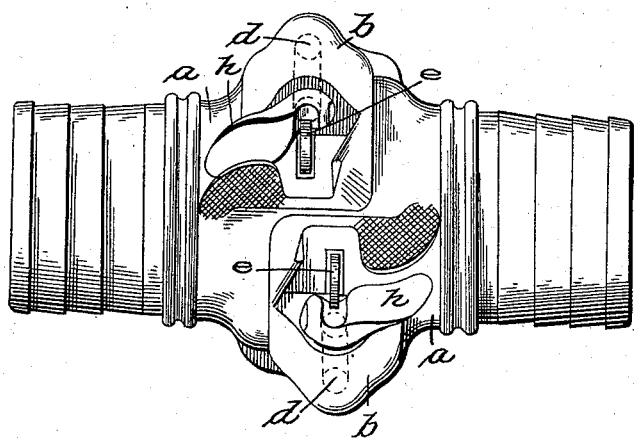
Figure 2:
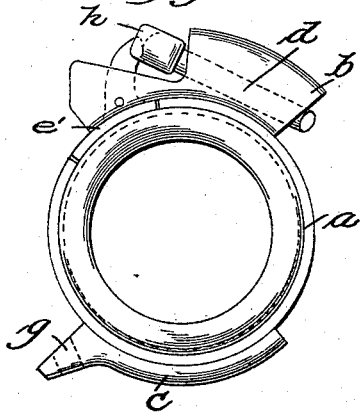

In the annexed drawings, Figure 1 illustrates a side view of the two symmetrical halves or sections of such a coupling joined together. Fig. 2 illustrates an end view of one of these sections; and Fig. 3, one of them partially in a cross-section, showing the position of the coupling-latch during the operation of connecting or disconnecting the sections.

Figure 3:
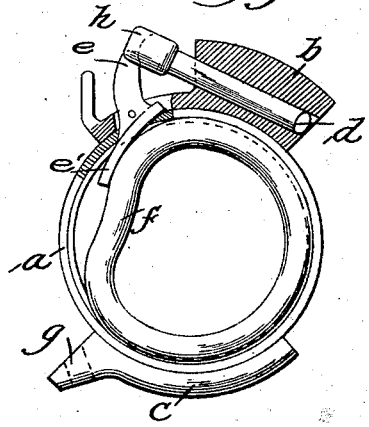

Each section $a$ is provided at its head end with two lugs $b$ $c$, Figs. 2 and 3, projecting diametrically opposite each other and over the said end of the section. A latch $d$ is arranged in one, $b$, of these lugs so as to be movable almost tangentially to the circumference of the coupling, and against this latch there is bearing one arm $e$ of a bell-crank $e$ $e'$, fulcrumed on the lug, while its other arm $e'$ enters into an opening through the wall of the section and is forced outward by an elastic ring $f$, which is inserted in the mouth of each section just inside of the bell-crank and serves as a packing-ring when the two sections or halves of the coupling are united. The other lug $c$ on each section is provided at one end with an aperture located so as to allow of the latch $d$ of the other section or half snapping into it when the two sections are pushed together. In order to facilitate the snapping of the latches, their ends may be sloping with reference to the axis of the coupling.

For disconnecting the coupling the handles $h$ of the two latches are pulled simultaneously, this action releasing the latches from the corresponding apertures, Fig. 3, and the sections or halves of the coupling are subsequently pulled apart. When the sections or halves are united, the pressure of the water in the hose will act on the elastic ring $f$ in each section, and said rings being thereby expanded will force the inner arms $e'$ of the bell-cranks outward, and inasmuch as the latches are pushed into the apertures with greater force the higher the water-pressure a firm engagement of the halves or sections of the coupling will be effected and all danger of an unintentional disengagement avoided.

Having now particularly described and ascertained the nature of my said invention and in what manner the same is to be performed, I declare that what I claim is—

In hose-couplings composed of two symmetrical halves the combination with each half of two projecting lugs $b$, $c$ diametrically opposite each other, the one $b$ of said lugs having a latch $d$ movable through it about tangentially to the circumference of the coupling and a bell-crank $e$, $e'$ fulcrumed on a stud parallel to the axis of the coupling and acting upon the latch with one of its ends the other end protruding to the inside of the coupling and being forced outward by means of an elastic ring $f$ inserted in the mouth of the coupling-half, the other lug $c$ being provided with an aperture $g$ in which the latch of the other section may catch when the two sections are pushed together.

In witness whereof I have hereunto set my hand in presence of two witnesses.

AUGUST WILHELM BILLMAN.

Witnesses:
H. ICLANDER,
T. RISBERG.